A. C. ROBINSON.
FILTER.
APPLICATION FILED APR. 11, 1916.

1,212,404. Patented Jan. 16, 1917.

Inventor:
Arthur C. Robinson
by his attorney

UNITED STATES PATENT OFFICE.

ARTHUR C. ROBINSON, OF EAST WEYMOUTH, MASSACHUSETTS.

FILTER.

1,212,404.          Specification of Letters Patent.      Patented Jan. 16, 1917.

Application filed April 11, 1916. Serial No. 90,475.

*To all whom it may concern:*

Be it known that I, ARTHUR C. ROBINSON, a citizen of the United States, residing at East Weymouth, in the county of Norfolk and State of Massachusetts, have invented new and useful Improvements in Filters, of which the following is a specification.

This invention relates to a filter preferably constructed so as to be capable of being reversed, and attachable to the outlet end of a faucet.

The invention consists in a tubular filter having a plurality of wire screens of different mesh inserted in the bore thereof.

The invention further consists in a filter made of a tube of thin metal with filtering means inserted in the bore of said tube and having a flange at one end thereof which extends outwardly beyond the periphery of said tube and terminates in a thin tubular portion which is adapted to bear against and press into a washer of yielding material interposed between said flange and the outlet end of the faucet to which said filter is attached.

The invention further consists in the particular arrangement of the wire screens in the bore of said filter, said screens being of different mesh as hereinafter fully set forth in the specification and claims.

The invention further consists in a filter constructed as hereinafter set forth in the specification and in the appended claims and in the combination of a filter with a faucet, the filter consisting of a tube made of thin metal with filtering means inserted in the bore of said tube and having a flange thereon extending outwardly beyond the periphery of said tube and terminating in a thin tubular portion, said faucet having a washer upon its outlet end into which said flange is constructed to project, whereby a water-tight connection is obtained between the filter and the outlet end of the faucet.

Figure 4:
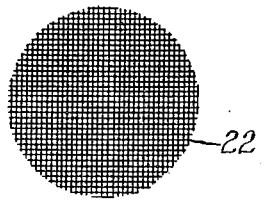
Figure 5:
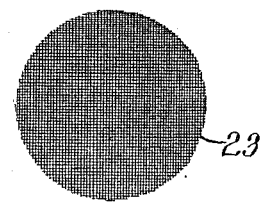
Figure 1:
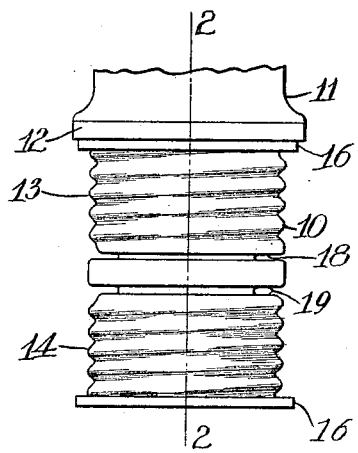
Figure 2:
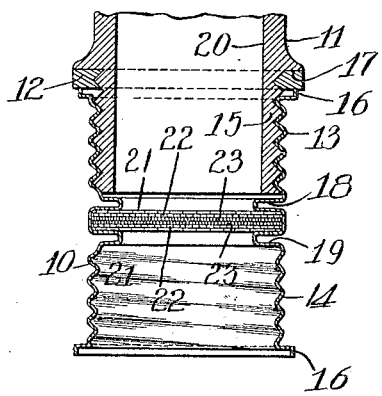
Figure 3:
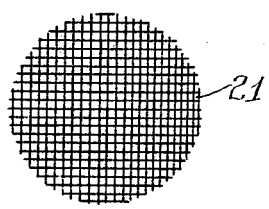
Figure 6:
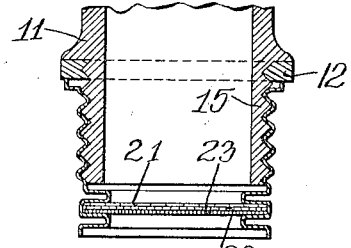

Referring to the drawings: Figure 1 is a side elevation of my improved reversible filter showing the same attached to the outlet end of a faucet, said faucet being broken away to save space in the drawings. Fig. 2 is a sectional elevation taken on line 2—2 of Fig. 1. Figs. 3, 4, and 5 are detail plan views of the wire screens of different mesh employed in the filter. Fig. 6 is a sectional elevation similar to Fig. 2 of a modified form of my invention.

Like numerals refer to like parts throughout the several views of the drawings.

In the drawings, referring to Figs. 1 to 5 inclusive, 10 is the filter, 11 is the outlet end of a faucet to which the filter is attached and 12 is a washer, preferably formed of rubber. The filter 10 is of tubular form and is made of thin metal, the opposite ends 13 and 14 of said tube being screw-threaded to engage a similarly screw-threaded portion 15 upon the outlet end of the faucet 11. Each end of the filter is provided with a flange 16, preferably of tubular form and arranged when the filter is screwed onto the screw-threaded portion 15 of the faucet to bear against the washer 12 and force it against a flange 17 provided upon the exterior of the outlet end of the faucet 11. The filter 10 is also provided with two annular flanges 18 and 19 which project beyond the interior bore 20 of the outlet end of the faucet, this construction conducing to the flow of a smooth stream of water. Between the flanges 18 and 19 are interposed a plurality of wire screens 21, 22 and 23 arranged in pairs. The screens 21 are of coarser mesh than the screens 22 and the screens 22 are of coarser mesh than the screens 23. The two screens 21 are arranged bearing against the flanges 18 and 19, respectively, and nearest the opposite ends, respectively, of the filter 10. Adjacent to the screens 21 are the screens 22 which are of finer mesh than the screens 21, while in the center, between the two flanges 18 and 19, are placed a pair of the finer screens 23.

It will be seen that by using screens of different mesh the wires of one screen will extend over the spaces of the screen adjacent thereto and partly close said spaces, so that a much finer filtering action may be obtained than if the screens were of the same mesh.

In the arrangement of screens illustrated in Fig. 2 the foreign material in the water which is not caught by the upper screen 21 may be caught by the screen 22 adjacent thereto and if not caught by said screen 22 will be caught by the upper or fine screen 23 in the central portion of the space between the flanges 18 and 19.

In use the end 13 of the filter is screwed upon the screw-threaded portion 15 of the faucet 11 until the flange 16 becomes partly embedded in the washer 12. After the filter has been used a certain time it is reversed and the screw-threaded portion 14 of the filter is screwed upon the screw-threaded portion 15 of the faucet and the foreign material which has lodged upon the upper screens 21, 22 and 23 as previously arranged upon the faucet will be washed off and out of the lower end of the filter, while the screens 21, 22 and 23 which previously were the lower screens of the set will now become the uppermost screens and will act in like manner to catch any foreign material which may be contained in the water passing through the filter. This operation of reversing the filter is performed as often as may be necessary and the foreign material is thus cleaned from the filter and said filter rendered efficient in its operation.

In Fig. 6 a modified form of my invention is illustrated which contains only three screens 21, 22 and 23 and one screw-threaded end portion. This filter is used by screwing the same onto the screw-threaded end portion of the faucet 11 and when the screens become clogged with foreign material the filter is unscrewed from the faucet, reversed and held against the end of the faucet until the foreign material becomes dislodged from the screens, when it is again attached to the faucet in the relative position illustrated in Fig. 6.

This construction makes a cheap filter and one that can be reversed and cleaned as hereinbefore set forth.

I claim:

1. A filter, consisting of a tube of thin metal screw-threaded to engage the screw-threaded outlet end of a faucet, filtering means inserted in the bore of said tube and a flange on the inlet end of said filter, said flange extending outwardly beyond said screw-threaded portion of said tube and terminating in a thin tubular portion.

2. In combination, a faucet terminating in a screw-threaded outlet portion and an annular flange on said faucet adjacent said screw-threaded portion, a washer on said screw-threaded portion and bearing against said flange and a filter consisting of a tube of thin metal having screw-threaded engagement with said screw-threaded portion of said faucet, filtering means inserted in the bore of said tube and a flange extending outwardly beyond said screw-threaded portion of said tube and terminating in a thin tubular portion arranged to bear at one end thereof against said washer.

3. A reversible filter, consisting of a tube of thin metal screw-threaded at its opposite ends, a pair of annular flanges projecting into the bore of said tube between said screw-threaded portions, a plurality of screens of different mesh interposed between said flanges and a flange on each of the opposite ends of said filter, each of said flanges extending outwardly beyond said screw-threaded portions of said tube and terminating in a thin tubular portion, in combination with a faucet having a screw-threaded outlet portion constructed to be engaged by either of the screw-threaded ends of said filter, a flange on said faucet adjacent said screw-threaded outlet end and a washer on said screw-threaded outlet end arranged to be clamped thereagainst by either one of said tubular flanges.

In testimony whereof I have hereunto set my hand in presence of two subscribing witnesses.

ARTHUR C. ROBINSON.

Witnesses:
CHARLES S. GOODING,
ANNIE J. DAILEY.

Copies of this patent may be obtained for five cents each, by addressing the "Commissioner of Patents, Washington, D. C."